United States Patent

Kovacs et al.

[11] Patent Number: 6,028,616
[45] Date of Patent: *Feb. 22, 2000

[54] ENHANCED COLOR GAMUT FROM 2-PASS XEROCOLOGRAPHY WITH 2λ IMAGER AND 2-LAYER PHOTORECEPTOR

[75] Inventors: Gregory J. Kovacs, Mississauga, Canada; Delmer G. Parker, Rochester, N.Y.

[73] Assignee: Xerox Corporation, Stamford, Conn.

[ * ] Notice: This patent is subject to a terminal disclaimer.

[21] Appl. No.: 08/956,962

[22] Filed: Oct. 23, 1997

[51] Int. Cl.[7] .............................. B41J 2/385; G03G 9/08
[52] U.S. Cl. ........................ 347/155; 430/42; 358/300; 347/111; 347/232
[58] Field of Search ....................... 347/118, 112, 347/119, 111, 115, 232; 399/232, 299, 179, 184; 430/42, 44; 358/300

[56] References Cited

U.S. PATENT DOCUMENTS

| | | | |
|---|---|---|---|
| 4,731,634 | 3/1988 | Stark | 399/232 |
| 4,868,611 | 9/1989 | Germain | 399/232 |
| 5,049,949 | 9/1991 | Parker et al. | 399/232 |
| 5,155,541 | 10/1992 | Loce et al. | 399/232 |
| 5,221,954 | 6/1993 | Harris | 347/119 |
| 5,223,906 | 6/1993 | Harris | 347/119 |
| 5,337,136 | 8/1994 | Knapp et al. | 399/299 |
| 5,347,303 | 9/1994 | Kovacs et al. | 347/118 |
| 5,373,313 | 12/1994 | Kovacs | 347/119 |
| 5,444,463 | 8/1995 | Kovacs et al. | 347/118 |
| 5,534,990 | 7/1996 | Harris | 347/115 |
| 5,565,974 | 10/1996 | Harris | 399/226 |
| 5,592,281 | 1/1997 | Parker et al. | 399/156 |
| 5,751,437 | 5/1998 | Parker et al. | 347/232 |
| 5,807,652 | 9/1998 | Kovacs | 430/42 |
| 5,837,408 | 11/1998 | Parker et al. | 430/42 |

*Primary Examiner*—John Barlow
*Assistant Examiner*—Shih-Wen Hsieh

[57] ABSTRACT

Xerographic printing system using a Raster Output Scanning (ROS) system incorporating a two wavelength (λ) laser diode source for the ROS and a charge retentive member in the form of a belt or drum structure which is responsive to the two wavelengths. The printing system utilizes a CAD development system in addition to two DAD developments during the second pass for enabling the addition of a gamut broadening color resulting in process color imaging with an enhanced gamut.

20 Claims, 5 Drawing Sheets

ENHANCED COLOR GAMUT FROM 2-PASS XEROCOLOGRAPHY WITH 2λ IMAGER AND 2-LAYER PHOTORECEPTOR

BACKGROUND OF THE INVENTION

This invention relates to a full color, xerographic printing systems using a Raster Output Scanning (ROS) system incorporating a two wavelength (λ) laser diode source for the ROS and a charge retentive member in the form of a belt or drum structure which is responsive to the two wavelengths and, more particularly, to two pass printing with enhanced color gamut.

Xerocolography (dry color printing) is a color printing architecture which combines multi-color xerographic development with multiwavelength laser diode light sources, with a single polygon, single optics ROS and with a polychromatic, multilayered photoreceptor to provide color printing in either a single pass or in two passes. Images created with a single pass are inherently perfectly registered \since the various color images are all written simultaneously at the same imaging station with the same ROS. In general, three latent images are written with each pass in each of the untoned or previously toned areas. Two of the three images are immediately developable because their voltage levels are offset from a background level while the voltage level of the third image is at the time of its formation equal to the background voltage level. An electrostatically distinguishable third image is formed when the photoreceptor is exposed to flood illumination of a predetermined wavelength.

U.S. Pat. No. 5,444,463 describes, in a xerocolographic machine, the use of a 2λ, imager and a 2-layer photoreceptor to produce a K+2 (black plus two colors) color image in a single pass. This system uses one CAD (charged area development) and two DAD (discharged area development) developments on the single pass. In order to extend this system to produce full process color, a second pass through the system is used. The colors deposited on each pass are spatially mutually exclusive. Therefore, one of the colors used on the first pass must be repeated on the second pass in order to place this color on top of other colors used in the first pass. For convenience the colors are referred to by single letters as follows: K(black), Y(yellow), C(cyan), M(magenta), R(red), G(green), B(blue), W(white), O(orange). For example, if K, Y and M are used on the first pass, then say M must be used on the second pass to get the YM(=R) combination. To get full process color in this two pass system then M and C would be used on the second pass, both in the DAD development mode, as described in U.S. Pat. No. 5,347,303. This two pass scheme results in the color combinations K, W, C, M, Y, CM(=B), MY(=R), and CY(=G). These color combinations are all of those required for process color. However, very high quality lithographic color also uses a CMY process black combination to allow smooth transitions and shades in dark regions of a print.

An imaging process which allows both CMY and CMYK to be produced in two pass xerocolography is possible. In such a process, CMY and Y and M are produced in the first pass where the CMY pigments are all mixed in the same toner to produce a CMY process black toner. On the second pass, a CAD K, DAD M, and DAD C housing are used. The addition of the CAD housing to the two DAD housings used on the second pass allows a process black to be achieved among the output color combinations. The color combinations possible with this imaging process are CMY, W, C, M, Y, CM(=B), MY(=R), CY(=G) and CMYK.

The color combinations described above are adequate for most lithographic quality printing applications. However, for very high quality color applications or for special effects, lithographic printers will often add a fifth station to their press. This fifth station would be used to add a gamut broadening color or to add a special effect color such as a metallic color.

In order to compete effectively with offset printing, there is a need for xerocolography to add a fifth gamut broadening color or to add a special effect color such as a metallic color.

Following is a discussion of additional prior art, also incorporated herein by reference, which may bear on the patentability of the present invention. In addition to possibly having some relevance to the question of patentability, these references, together with the detailed description to follow, are intended to provide a better understanding and appreciation of the present invention.

U.S. Pat. No. 4,731,634 entitled "Apparatus For Printing Black And Plural Highlight Color Images In A Single Pass" granted to Howard M. Stark on Mar. 15, 1988 discloses a method and apparatus for rendering latent electrostatic images visible using multiple colors of dry toner or developer and more particularly to printing toner images in black and at least two highlighting colors in a single pass of the imaging surface through the processing areas of the printing apparatus. Two of the toners are attracted to only one charge level on a charge retentive member to thereby providing black and one highlight color while two toners are attracted to another charge level to form the second highlight color.

U.S. Pat. No. 4,868,611 entitled "Tri-Level Xerography Scorotron Neutralization Concept" granted to Richard P. Germain on September 19, 1989 discloses the use of a scorotron after the development of a first image. The scorotron serves to bring that first image to complete charge neutralization which removes the voltage responsible for the fringe fields thereby precluding fringe field development during the development of a subsequent image.

U.S. Pat. No. 5,049,949 entitled "Extension Of Tri-Level Xerography To Black Plus 2 Colors" granted to Parker et al on Sep. 17, 1991 discloses a highlight color printing apparatus and method for forming one black and two color images. A tri-level image containing CAD and DAD image areas and a background area is formed. A second DAD image is formed by discharging the background area forming part of the tri-level image.

U.S. Pat. No. 5,155,541 entitled "Single Pass Digital Printer With Black, White And 2-Color Capability" granted to Robert P. Loce et al on Oct. 13, 1992 discloses a method and apparatus for printing toner images in black and at least two highlighting colors in a single pass of the imaging surface through the processing areas of the printing apparatus. Imaging and development techniques of color photography and tri-level xerography are combined to produce images with black and two colors wherein the two highlighting colors are developed with only one color toner. A single imaging step forms a four level charge pattern on a charge retentive member followed by development of two of the image levels using tri-level imaging techniques. Uniform exposure of the imaging surface, similar to that used in color photography techniques precedes development of the last image. The uniform exposure modifies the last developed image level and the background charge level allowing development of the last image with a single toner.

U.S. Pat. No. 5,221,954 entitled "Single Pass Full Color Printing System Using A Quad-Level Xerographic Unit" granted to Ellis D. Harris on Jun. 22, 1993 discloses a four color toner single pass color printing system consisting generally of a raster output scanner (ROS) optical system and a quad-level xerographic unit and a tri-level xerographic unit in tandem. The resulting color printing system would be able to produce pixels of black and white and all six primary colors. The color printing system uses a black toner and toners of the three subtractive primary colors or just toners of the three subtractive primary colors.

U.S. Pat. No. 5,223,906 entitled "Four Color Toner Single Pass Color Printing System Using Two Tri-Level Xerographic Units" granted to Ellis D. Harris on Jun. 29, 1993 discloses a four color toner single pass color printing system consisting generally of a raster output scanner (ROS) optical system and two tri-level xerographic units in tandem. Only two of the three subtractive primary colors of cyan, magenta and yellow are available for toner dot upon toner dot to combine to produce the additive primary colors. The resulting color printing system would be able to produce pixels of black and white and five of the six primary colors, with pixel next to pixel printing producing all but the strongest saturation of the sixth primary color, an additive primary color. The color printing system uses either four color toners or a black toner and three color toners.

U.S. Pat. No. 5,534,990 entitled "Full Color Printing System Using A Penta-Level Xerographic Unit" granted on Jul. 9, 1996 to Ellis D. Harris discloses a single pass full color printing system consisting generally of a raster output scanner (ROS) optical system and a quad-level xerographic unit and a penta-level xerographic unit in tandem. This full color printing system produces pixels of black and white and all six primary colors without toner upon toner.

U.S. Pat. No. 5,337,136 entitled "Tandem Tri-level Process Color Printer" granted to John F. Knapp et al on Aug. 9, 1994 discloses a tandem tri-level architecture. Three tri-level engines are arranged in a tandem configuration. Each engine uses one of the three primary colors plus one other color. Spot by spot, two color tri-level images can be created by each of the engines. The spot by spot images are transferred to an intermediate belt member, either in a spot on spot manner for forming full color images or in a spot next to spot manner to form highlight and/or logo color images. The images created by the tri-level engines can also be transferred to the intermediate in a manner such that both spot next to spot and spot on spot transfer is effected.

U.S. Pat. No. 5,347,303 entitled "Full Color Xerographic Printing System With Dual Wavelength, Single Optical System ROS And Dual Layer Photoreceptor" granted on Sep. 13, 1994 to Kovacs et al discloses a full color xerographic printing system, either two pass or single pass, with a single polygon, single optical system Raster Output Scanning (ROS) system which has a dual wavelength laser diode source for the ROS which images the dual beams at a single station as closely spaced spots or at two stations as closely spaced spots on a dual layer photoreceptor with each photoreceptor layer sensitive to or accessible by only one of the two wavelengths.

U.S. Pat. No. 5,373,313 entitled "Color Xerographic Printing System With Multiple Wavelength, Single Optical System ROS And Multiple Layer Photoreceptor" granted to Gregory J. Kovacs on Dec. 13, 1994 discloses single pass color xerographic printing system with a single polygon, a single optical system Raster Output Scanning (ROS) system which has a multiple wavelength laser diode source for the ROS which images the multiple beams at a single station as closely spaced spots on a multiple layer photoreceptor with each photoreceptor layer sensitive to or accessible to only one of the multiple wavelengths.

U.S. Pat. No. 5,444,463 entitled "Color Xerographic Printing System With Dual Wavelength, Single Optical System ROS And Dual Layer Photoreceptor" granted to Kovacs et al on Aug. 22, 1995 discloses a single pass color xerographic printing system with a single polygon, single optical system Raster Output Scanning (ROS) system which has a dual wavelength laser diode source for the ROS which images the dual beams at a single station as closely spaced spots on a dual layer photoreceptor with each photoreceptor layer sensitive to or accessible by only one of the two wavelengths.

U.S. Pat. No. 5,565,974 entitled "Penta-Level Xerographic Unit" granted to Ellis D. Harris on Oct. 15, 1996 discloses a penta-level xerographic unit which produces five exposure levels on a photoreceptor. The five exposure levels select between a subtractive and an adjacent additive primary color in both the CAD and DAD operational regimes of a xerographic process. Exposure levels intermediate between the CAD and the DAD result in white. The selection of two possible colors in CAD, or two possible colors in DAD, or the selection of no toner yields a possibility of five colors. This penta-level xerographic unit can be used for a K+3 reduced color gamut printer, typically cyan, yellow and red plus black.

U.S. Pat. No. 5,592,281 entitled "Development Scheme For Three Color Highlight Color Trilevel Xerography" granted to Parker et al on Jan. 7, 1997 discloses the creation of multiple color images in a single pass utilizing a multilayered photoreceptor structure having layers which are responsive to different wavelength lasers. A composite image including three images areas is formed with substantially perfect registration. A CAD and DAD image are developed using CMB (conductive magnetic brush) development and a second DAD image is developed using a non-interactive development system. Development of the second DAD image without developing halos around the CAD image is accomplished by uniformly recharging the photoreceptor to the background potential prior to the formation and development of the second DAD image.

U.S. patent application Ser. No. 08/916,461 (Attorney Docket Number D/97037) relates to an imaging system which combines the perfect registration capabilities of xerocolography to form perfectly registered red, green and blue images in a single pass in one mode of operation. In another mode of operation, the color gamut possible with RGB toners is extended using black or another color toner to develop an image that is formed using a second imager or exposure device. The result is an extended gamut color imaging process using four colors side by side in a single pass with a minimum amount of color desaturation and with a minimum number of image registrations. Yet another mode of operation provides for creating K+2 colors in a single pass. The three or two colors used may be highlight colors and/or logo colors.

U.S. patent application Ser. No. 08/915,403 (Attorney Docket Number D/97040) relates to full process color imaging with the use of two xerocolography engines in tandem. Each of the two xerocolography engines is capable of creating three perfectly registered latent images with subsequent development thereof in a spot next to spot manner. Each engine is provided with three developer housing structures containing five different color toners including the three subtractive primary colors of yellow, cyan and magenta. Two of the primary colors plus black are used with one of the engines. The third primary color is used with the second tandem engine which also uses one of the primary colors used with the first engine as well as a fifth color which may be a logo or a gamut extending color. The full process color imaging capability provided is effected without any constraints regarding the capability of the laser imaging device to image through previously developed components of a composite image. Also, the development and cleaning field difficulties imposed by quad and higher level imaging of the prior art are avoided. Moreover, the number of required image registrations compared to conventional tandem color imaging is minimal. Therefore, only one registration is required compared to three or four by conventional tandem engine imaging systems.

U.S. patent application Ser. No. 08/915,430 (Attorney Docket Number D/97252) relates to a process for producing eight distinct colors, (viz. K, C, M, Y, CM, CY, MY and W) in a single pass with a single exposure in a 3λ/3L (3 wavelength/3 layer photoreceptor) imaging system is provided. The use of xerocolography with a fifth developer housing containing the same color toner as one of the four normally used developer housings and suitable flood exposure devices overcomes the limitations of prior art process color imaging systems which utilize an exposure device capable of emitting light beams at three different wavelengths and a photoreceptor having three layers responsive to the three wavelengths.

BRIEF DESCRIPTION OF THE INVENTION

In accordance with the present invention, a xerographic printing system is disclosed which uses a Raster Output Scanning (ROS) system incorporating a two wavelength (λ) laser diode source for the ROS and a charge retentive member in the form of a belt or drum structure that is responsive to the two wavelengths. The printing system utilizes a CAD development system in addition to two DAD developments during the second pass of a the two pass printing system for enabling the addition of a gamut broadening color resulting in process color imaging with an enhanced color gamut.

DETAILED DESCRIPTION OF THE PREFERRED EMBODIMENT(S) OF THE INVENTION

Figure 1:
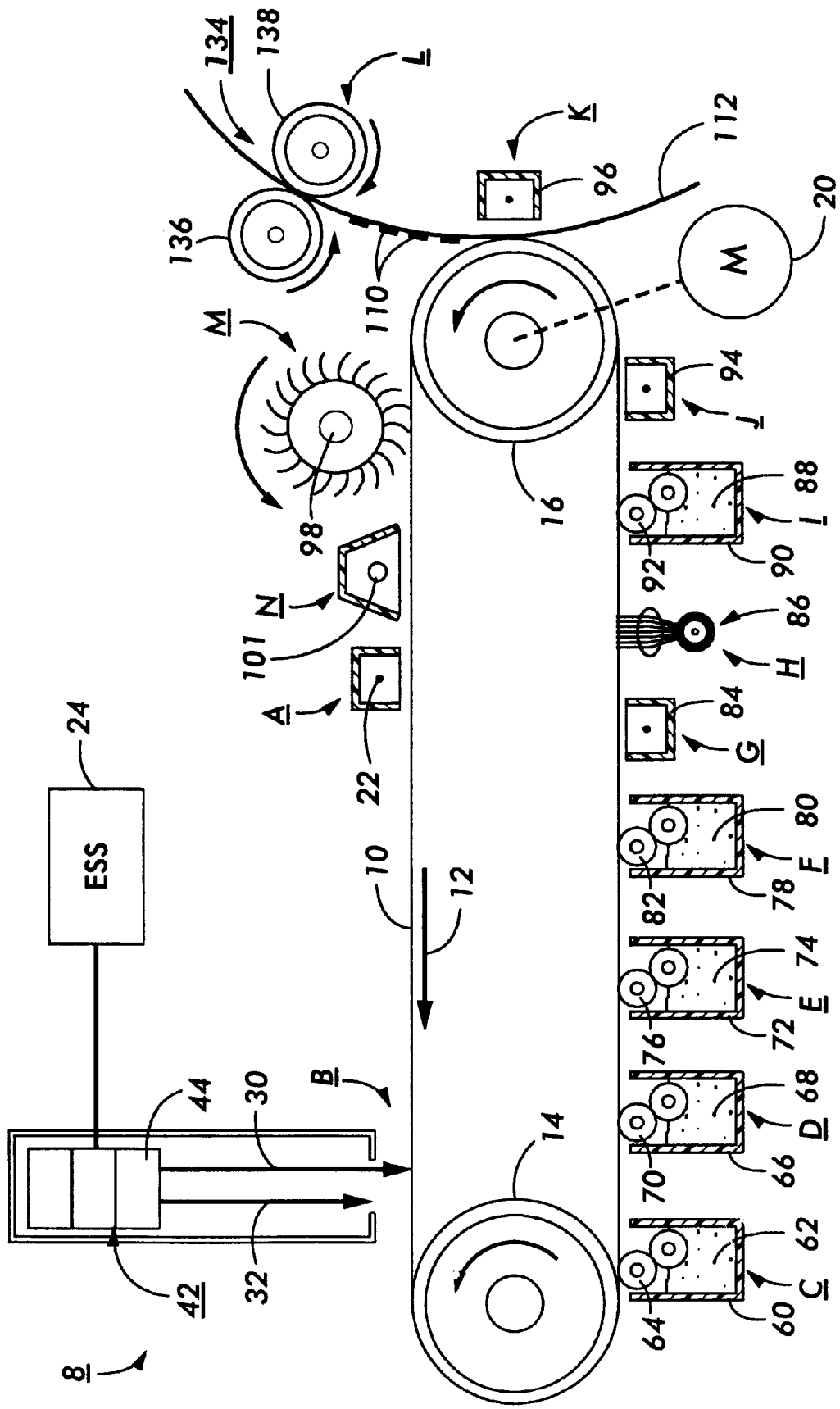
FIG. 1 is a schematic illustration of a system architecture incorporating the invention.

As shown in FIG. 1, xerocolography engine 8 comprises a charge retentive member in the form of a photoconductive belt structure 10 comprising a photoconductive surface and an electrically conductive substrate. The belt 10 is mounted for movement past a charging station A, an image exposure station B, a first CAD development station C, a second CAD development station D, a first DAD development station E, a second DAD development station F, a voltage leveling station G, a flood illumination station H, a third DAD development station I, a pretransfer station J, a transfer station K, a fusing station L, a cleaning station M and an erase station N.

Belt 10 moves in the direction of arrow 12 to advance successive portions thereof sequentially through various processing stations disposed about the path of movement thereof. Belt 10 is entrained about a plurality of rollers 14 and 16. The roller 16 may be used as a drive roller and the roller 14 may be used to provide suitable tensioning of the photoreceptor belt 10. Motor 20 rotates roller 16 to advance belt 10 in the direction of arrow 12. Roller 16 is coupled to motor 20 by suitable means, not shown.

As can be seen by further reference to FIG. 1, initially successive portions of belt 10 pass through charging station A. At charging station A, a corona discharge device such as a scorotron, corotron or dicorotron indicated generally by the reference numeral 22, charges the belt 10 to a selectively high uniform positive or negative potential.

Next, the uniformly charged portions of the photoreceptor surface are advanced through exposure station B. At exposure station B, the uniformly charged photoreceptor or charge retentive surface 10 is exposed to a laser based Raster Output Scanning (ROS) device 23 which effects selective discharge of the photoreceptor belt structure 10. Any suitable control such as an Electronic SubSystem (ESS) 24, well known in the art, may be employed for controlling the ROS modulation device 23 as well as controlling the other functions of the engine 8.

The ROS 23 can use a dual wavelength hybrid or monolithically integrated laser semiconductor structure (not shown) consisting of a red, e.g. 670 nm, wavelength laser emitter such as a semiconductor structure of AlGaInP/GaAs and an infrared, e.g. 830 nm, laser emitter such as a semiconductor structure of AlGaAs/GaAs, both laser emitter structures being known to those of ordinary skill in the art.

The different wavelength beams 30 and 32 are scanned sequentially over each other on the photoreceptor to yield excellent registration. The tangential offset of the laser sources is given an upper limit of 300 μm since tangential offset does not introduce scan line bow. The effect of tangential offset is to require delay in the electronic modulation signals to one of the dual beams relative to the other since one beam lags the other during scanning across the photoreceptor. Sagittal offset can also be used so that the beams are simultaneously scanning adjacent lines. On each successive scan, the line previously scanned by the forward beam is overscanned by the trailing beam. Appropriate image processing algorithms produce the desired image. The dual wavelength laser structure provides a substantially common spatial origin for each beam. Each beam is independently modulated so that it exposes the photoreceptor structure in accordance with a respective color image.

The two laser beams 30 and 32 emitted from a laser structure, not shown are directed to a conventional beam input optical system (not shown) which collimates, conditions and focuses the beams onto optical paths such that they impinge on a rotating polygon mirror 42 having a plurality of facets 44. As the polygon mirror rotates, the facets cause the reflected beams to deflect repeatedly in the direction indicated by the beams 30 and 32. The deflected laser beams are input to a single set of imaging and correction optics (not shown), which corrects for errors such as polygon angle error and wobble and focuses the beams onto the photoreceptor belt structure 10.

Figure 2:
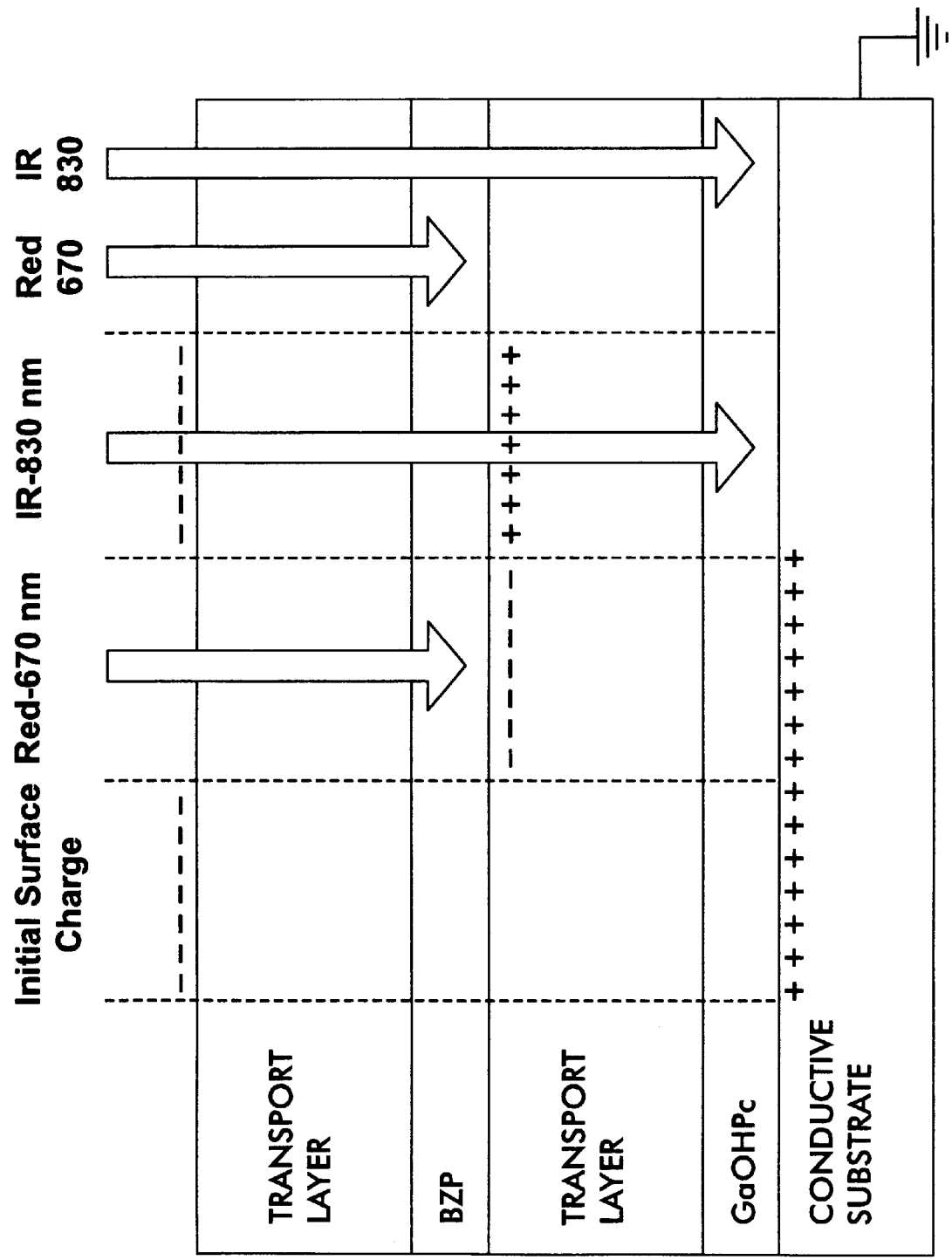
FIG. 2 is a schematic illustration of a dual layer photoreceptor following exposure thereof.

The photoreceptor belt 10 consists of a flexible electrically conductive substrate 50 (see FIG. 2). The substrate can be opaque, translucent, semitransparent, or transparent, and can be of any suitable conductive material, including copper, brass, nickel, zinc, chromium, stainless steel, conductive plastics and rubbers, aluminum, semitransparent aluminum, steel, cadmium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. In addition, the substrate can comprise an insulative layer with a conductive coating, such as vacuum-deposited metallization on plastic, such as titanized or aluminized Mylar™ polyester, wherein the metalized surface is in contact with the bottom photoreceptor layer or any other layer such as a charge injection blocking or adhesive layer situated between the substrate and the bottom photoreceptor layer. The substrate has an effective thickness, typically between about 6 and 250 microns, and preferably from about 50 to about 200 microns, although the thickness can be outside of this range. The photoreceptor belt further comprises a pair of photoreceptor structures each including a charge generation layer and a charge transport layer.

Adhered to the substrate 50 is a first or lower generator layer 52 of GaOHPc approximately 0.1 to 1 $\mu$m thick, a first or lower transport layer 54 of N,N'-diphenyl-N,N'-bis(3"-methylphenyl)-(1,1'-biphenyl)-4,4'-diamine (TPD) in polycarbonate which is hole transporting and approximately 15 $\mu$m thick, a second or upper generator layer 56 of benzimidazole perylene (BZP) approximately 0.1 to 1 $\mu$m thick, a second or upper transport layer 58 of TPD in polycarbonate which is hole transporting and approximately 15 $\mu$m thick.

The GaOHPc generator layer is thin enough to maintain low dark decay and the BZP generator layer is thick enough to be opaque to the wavelength used to discharge it. BZP is known to be coatable to opaque thicknesses while maintaining low dark decay.

For this illustrative example, the GaOHPc generator layer is infrared sensitive at 830 nm and the BZP generator layer is red sensitive at 670 nm. Each generator layer can only be accessed by one of the two wavelengths. The BZP layer does not absorb the 830 nm wavelength and passes it to the GaOHPc layer. The 670 nm wavelength is absorbed by the BZP layer and is not transmitted to the GaOHPc layer (which would also be sensitive to the 670 nm light).

The generator and transport layers can be deposited by vacuum evaporation or solvent coating upon the substrate by means known to those of ordinary skill in the art.

During exposure of the photoreceptor belt 10 to the light beams from the ROS, the 670 nm wavelength of one modulated beam would be entirely absorbed in the opaque BZP generator layer. Exposure with the 670 nm beam would therefore discharge the BZP and upper transport layer 58. None of the 670 nm light beam would reach the GaOHPc layer so that it and the lower transport layer 54 would remain fully charged. The second wavelength is chosen to be 830 nm to insure that it will pass completely through the BZP layer without effecting any discharge of that layer or upper transport layer 58. However, the GaOHPc layer is sensitive to 830 nm and exposure with this wavelength from a modulated beam will discharge that layer and the lower transport layer 54. The 830 nm exposure should not be allowed to effect discharge through the benzimidazole perylene layer and the upper transport layer.

As illustrated in FIG. 2, exposure of an area of the photoreceptor belt 10 to the both wavelengths or to only one of the wavelengths results in the photoreceptor being electrostatically conditioned as follows: (a) the unexposed areas which retain the original surface voltage, (b) areas exposed with the 830 nm beam which are discharged to roughly one-half of the original surface voltage, $V_0$, (c) areas exposed with the 670 nm beam which are also discharged to roughly one-half of the original photoreceptor voltage, and (d) the areas exposed with both the 830 nm and 670 nm wavelength beams which are fully discharged. While only three voltage levels are present on the photoreceptor immediately following exposure, there will be four distinctly different areas after xerographic development during the first pass of the photoreceptor through the process stations. While the surface voltages in regions (b) and (c) are roughly equal after exposure they have been formed in very distinct ways. During the development process the photoreceptor will remember how these voltages were formed to allow development in very different ways in the two regions.

The image area represented by (a) corresponds to the CAD portion of a tri-level image while the image area represented by (d) corresponds to the DAD portion of a tri-level image. The areas represented by (b) and (c) in FIG. 2 are at a voltage level corresponding to the background level of the tri-level image. Because of the way these images were formed the area (b) represents a second DAD image area which initially is not distinguishable from the background voltage level at (c). At the appropriate point in the imaging process, the second DAD image is rendered distinguishable so that it can be developed.

A first CAD developer housing 60 containing black developer 62 comprising carbon black loaded thermoplastic toner particles, suitable additives as well as carrier particles is provided for forming black images in a first pass of the photoreceptor belt past the process stations. A donor roll 64 forming a part of the developer housing 60 serves to deposit black toner particles on the CAD portion of the tri-level image formed by the exposure device 23. While the developer housing structure is illustrated as being a Non Interactive Development (NID) device, a CMB magnetic brush development system may also be employed since this CAD image is the first image developed.

A second CAD developer housing 66 may contain, for example, developer 68 comprising orange pigmented toner particles which are deposited on CAD images formed during a second pass of the photoreceptor through the imaging station. Deposition of the orange toner is effected using a donor roll 70. An algorithm stored in computer memory in the ESS 24 serves to render this developer housing structure inoperable during the first pass of the photoreceptor.

As the tri-level image is moved past a yellow (Y) developer housing structure 72, yellow imaging material such as toner from developer 74 is deposited on the DAD image area of the tri-level image via an electroded donor roll structure 76. This development station could also employ a soft CMB magentic brush development system. The order of the CAD and first DAD development can be reversed since there are no intervening steps in the process.

A second DAD developer housing structure 78 containing cyan (C) developer 80 is provided for depositing cyan toner on DAD images during a second pass of the photoreceptor past the process stations. This developer housing structure has a donor roll 82 for such purposes.

A recharge or voltage leveling corona discharge device 84 is provided for eliminating fringe field development (by the fifth DAD housing 88) of the CAD and DAD images already developed by housings 60 and 72.

The recharge or voltage leveling step is followed by flood exposing the entire photoreceptor 10 using a flood exposure lamp and dual bandpass selectable filter 86 operating at a suitable wavelength band. The selectable dual bandpass filter is shown in FIG. 1 as a rotatable filter. The effect of this exposure step is to discharge regions of the photoreceptor containing virtual images formed during the image forming process thereby forming a second developable DAD image.

The toners used to develop the CAD and first DAD images during the first pass are opaque to light at the wavelength of the flood exposure in order to avoid developing a voltage offset in the photoreceptor areas covered by these toners after the recharge and flood exposure.

The second developable DAD image is rendered visible using with magenta (M) developer 88 contained in a developer housing 90, the developer housing being provided with a donor roll 92 for this purpose.

During the first pass of the photoreceptor through the process stations, a pretransfer corona discharge device 94 is inoperative, as is a transfer corona discharge device 96. A cleaning brush structure 98 disposed at the cleaning station for removing residual toner particles from the photoreceptor is also rendered inoperative by the machine controls.

An erase lamp (shown as) 101 which is operative during both passes of the photoreceptor through the process stations floods the photoconductive surface with white light to dissipate any residual electrostatic charge remaining prior to the charging thereof pursuant to the next imaging cycle. This erase is shown as incident on the front of the photoreceptor. However it could also be incident from the back of the photoreceptor and may in fact be more effective in penetrating the full photoreceptor structure.

Once the erase step has taken place, the photoreceptor is recharged using the corona discharge device 22 pursuant to forming a second xerocolographic image. The exposure device forms the second such image which is followed immediately by development of the CAD portions of the second image with a gamut broadening color toner such as orange toner from the developer housing structure 66.

A second DAD image formed during the second pass is developed during the second pass with cyan toner contained in the second DAD developer housing structure 78 followed by the voltage leveling effect of corona discharge device 84. The flood exposure lamp and dual band pass selectable (rotatable) filter 86 is again activated using the other of the two wavelength bands to prepare a second virtual image for development using the third DAD development housing structure 90.

Because the composite image developed on the photoreceptor consists of both positive and negative imaging material such as toner, a typically positive pretransfer corona discharge member 94 disposed at pretransfer charging station J is provided to convert the toner to all the same sign of charge for effective transfer to a substrate using typically positive corona discharge. The pretransfer corona discharge member is preferably an AC corona device biased with a DC voltage to operate in a field sensitive mode and to perform tri-level xerography pretransfer charging in a way that selectively adds more charge (or at least comparable charge) to the part of composite tri-level image that must have its polarity reversed compared to elsewhere. This charge discrimination can be enhanced by discharging the photoreceptor carrying the composite developed latent image with light (not shown and usually done through the back of the photoreceptor belt) before the pretransfer charging begins. Furthermore, flooding the photoreceptor with light coincident with the pretransfer charging minimizes the tendency to overcharge portions of the image which are already at the correct polarity.

Transfer of color images 110 to a substrate such as plain paper 112 is effected using the transfer corona discharge device 96.

The residual toner particles adhered to the photoreceptor are removed therefrom with the cleaning brush structure 98.

Subsequent to cleaning, the erase lamp (shown as) 101 positioned at station N floods the photoconductive surface with white light to dissipate any residual electrostatic charge remaining prior to the charging thereof for the successive imaging cycle.

Fusing station L includes a fuser assembly, indicated generally by the reference numeral 134, which permanently affixes the transferred powder image to substrate 112. Preferably, fuser assembly 134 comprises a heated fuser roller 136 and a pressure roller 138. Substrate 112 passes between fuser roller 136 and pressure roller 138 with the toner powder images contacting fuser roller 136. In this manner, the toner powder image is permanently affixed to substrate 112. After fusing, a chute, not shown, guides the advancing substrate 112 to a catch tray, also not shown, for subsequent removal from the printing machine by the operator.

Figure 3:
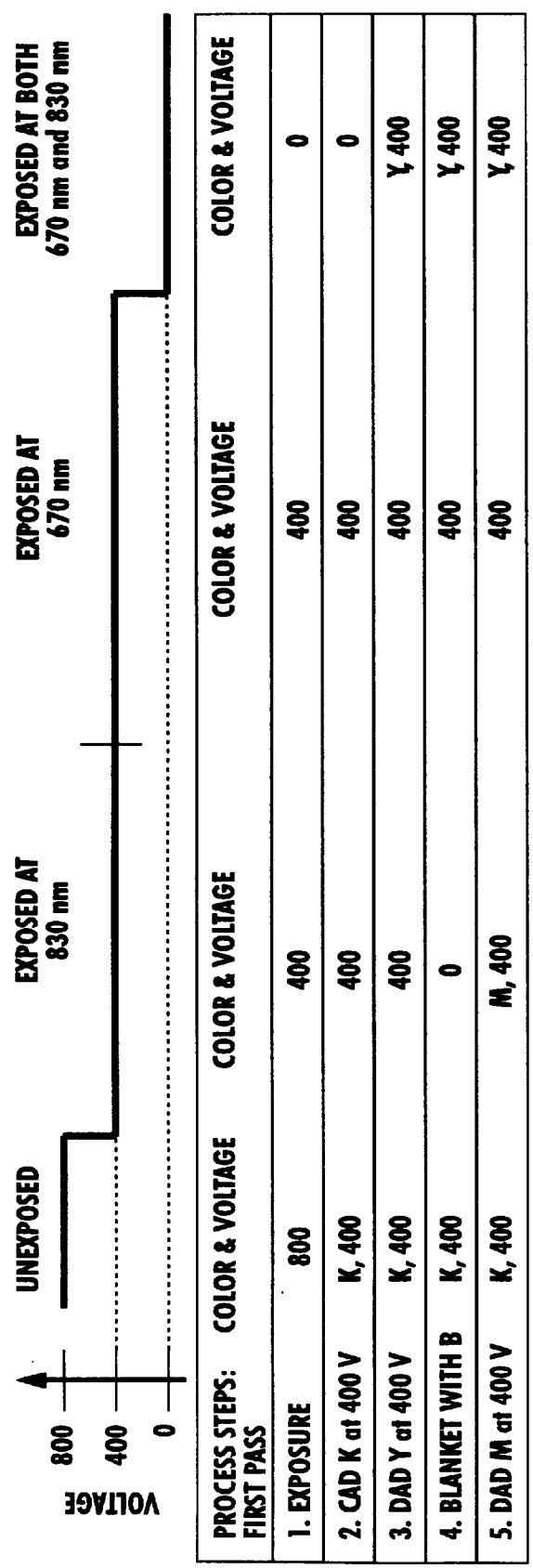
FIG. 3 illustrates the steps occurring during the first pass of a photoreceptor past the process stations of the system architecture of FIG. 1.
Figure 4:
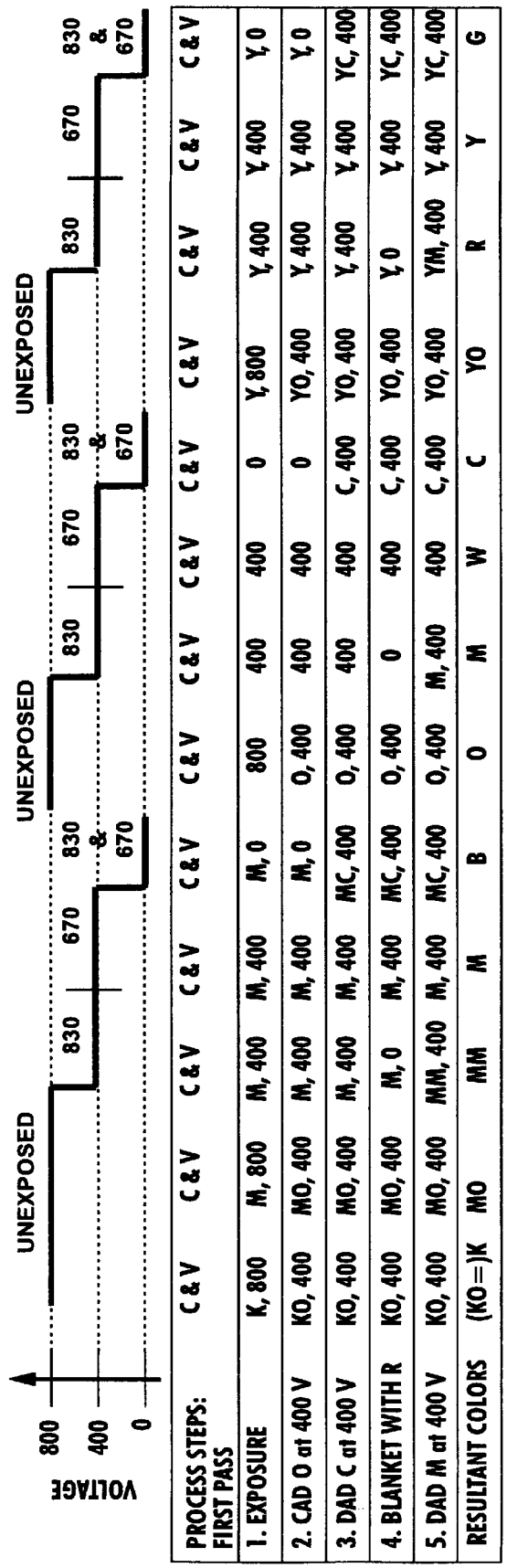
FIG. 4 illustrates the steps occurring during the second pass of a photoreceptor past the process stations of the system architecture of FIG. 1.
Figure 5:
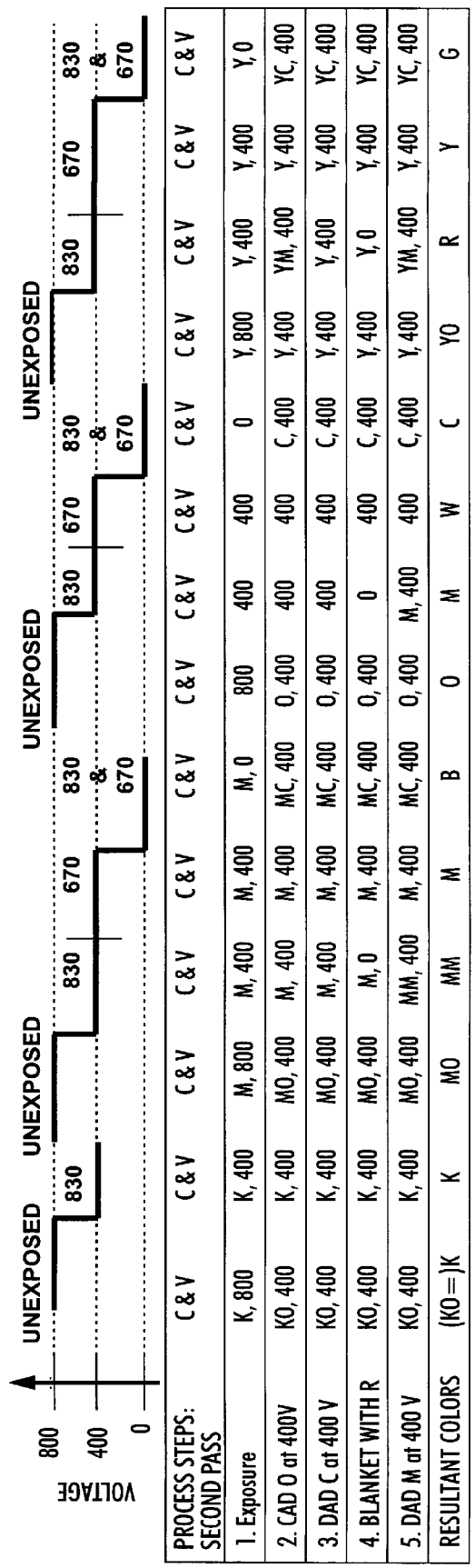
FIG. 5 illustrates the steps occurring during the second pass of a photoreceptor past the process stations of the system architecture of FIG. 1 for a modified imaging process.

The process steps for developing the gamut broadened full color image according to each embodiment of the invention are shown in FIGS. 3, 4 and 5. The process steps on the first pass shown in FIG. 3 are the same as have been described previously for the single pass K+2 color system. A blanket exposure with blue light is used on the first pass since this light will be absorbed by the K and Y toned areas of the photoreceptor.

On the second pass as shown in FIG. 4 laser exposure is made with both red and infrared beams in all areas of the photoreceptor which are untoned or are toned with yellow or magenta toner. In the areas toned with K toner, no exposure is made with either red or infrared beams since the K colorant is assumed to be carbon black which cannot be readily penetrated by either red or infrared laser beams. The development steps are then the same as have been described previously for the two pass process color system with one exception. The exception is that a CAD development of the gamut enhancing color is inserted as step 2 immediately after the exposure step on the second pass. This gamut enhancing color is taken to be orange(O) in FIG. 4. This CAD development of O immediately after exposure on the second pass results in development of O in all of the unexposed areas at 800V. Therefore, O is selectively deposited over K, M and Y toners and also over previously white areas. At the end of the second pass, there then result additional colors due to the O toner deposition. The additional colors are MO, O and YO. A KO also results but on transfer to paper the O is covered by the K which results in the appearance of a simple K layer. Therefore, the gamut has been broadened by the addition of MO, O and YO colors. It is apparent from FIG. 3 that steps 2 and 3 in the first pass can be interchanged and steps 2 and 3 can be interchanged in the second pass also to produce the same resultant colors. Therefore, these modified processes are also included within the scope of this invention.

The process described in FIGS. 3 and 4 is modified as illustrated in FIGS. 3 and 5 to produce a K toned area which is not covered by the gamut broadening O color toner. This process is described in FIGS. 3 and 5 and is achieved by using an organic pigment for K instead of carbon black. Here, the process during the first pass is the same as described in FIG. 3 while the process for the second pass is described with reference to FIG. 5. This organic pigment should be IR transmissive so that the K areas developed in the first pass can be penetrated with IR light on the second pass by the ROS. Therefore, in addition to the unexposed K area moving into the second pass, there is also the possibility of an IR exposed K area with voltage reduced to the mid level. During the CAD development of O, the K area at mid level is not developed. Therefore, in addition to the color combinations resulting in FIG. 4 there is also a single toner layer K area which is produced in the scheme of FIG. 5. This simple K area can be used to avoid the K covered by O area which results from the scheme in FIG. 4. This will result in a cleaner black which is simpler to transfer.

It should be noted that in both the schemes in FIGS. 3 and 4 and in FIGS. 3 and 5 the gamut broadening color O is arbitrary and it can be chosen to be a different color. It can also be chosen to be a special effect color such as a metallic color.

What is claimed:

1. A method of creating process color images in two passes of a charge retentive structure though a plurality of process stations, said method including the steps of:

uniformly charging a charge retentive structure of an imaging device to a uniform voltage level;

in a first pass of said charge retentive structure through a plurality of processing stations, creating tri-level latent electrostatic images comprising first CAD and DAD images at two different voltage levels, background areas at a third voltage level and a first virtual image at a voltage level which is substantially the same as said background areas;

developing said first CAD and DAD images with two different color inks;

conditioning said first virtual image for forming a developable DAD image;

developing said developable DAD image formed by said step of conditioning with ink of a different color from said two different colors;

in a second pass of said charge retentive structure through a plurality of processing stations, creating tri-level latent electrostatic images comprising second CAD and DAD images at two different voltage levels, background areas at a third voltage level and a second virtual image at a voltage level which is substantially the same as said background areas;

developing said second CAD images formed in said second pass with an ink different from said color inks used in said first pass of the charge retentive structure;

developing said second DAD image formed in said second pass with another color ink different from all other color inks previously used;

conditioning said second virtual image formed during said second pass to form a developable DAD image;

developing said developable DAD image formed from the second virtual image formed during said second pass with an ink that is the same color as one of the inks used in said first pass; and conditioning said developed images for effecting transfer thereof to a final substrate.

2. The method according to claim 1 wherein said step of creating tri-level images is effected using a single exposure device operating at two different wavelengths and said charge retentive structure comprises two layers each responsive to one of said two different wavelengths.

3. The method according to claim 2 including the step of leveling the voltage prior to each of said conditioning steps.

4. The method according to claim 3 wherein said conditioning means for the first and second virtual images comprises a dual wavelength band flood exposure lamp and a selectable bandpass filter for selection between wavelength bands of said exposure lamp.

5. The method according to claim 4 wherein the colors of inks developed during a first pass comprise two of the three subtractive primary colors.

6. The method according to claim 5 wherein the colors of inks developed during a second pass comprise two of the three subtractive primary colors, one of which color of inks used during the second pass is the same as one of the colors of inks used during the first pass.

7. The method according to claim 6 wherein one of the inks used during a second pass comprises the other of the subtractive primary colors not used in the first pass.

8. The method according to claim 7 wherein said color of ink used in said second pass that is the same as one of the color of inks used in the first pass is magenta.

9. The method according to claim 1 wherein said ink for developing said CAD images formed during said first pass contains carbon black.

10. The method according to claim 1 wherein said ink for developing said CAD images formed during said first pass contains black organic pigment.

11. Apparatus for creating process color images in two passes of a charge retentive structure though a plurality of process stations, said apparatus comprising:

means for uniformly charging a charge retentive structure of an imaging device to a uniform voltage level;

means for creating, in a first pass of said charge retentive structure through a plurality of processing stations, tri-level latent electrostatic images comprising first CAD and DAD images at two different voltage levels, background areas at a third voltage level and a first virtual image at a voltage level which is substantially the same as said background areas;

developer structure for developing said first CAD and DAD images with two different color inks;

first means for conditioning said first virtual image for forming a developable DAD image;

developer structure for developing said developable DAD image formed by said step of conditioning with ink of a different color from said two different colors;

means for creating, in a second pass of said charge retentive structure through a plurality of processing stations, tri-level latent electrostatic images comprising second CAD and DAD images at two different voltage levels, background areas at a third voltage level and a second virtual image at a voltage level which is substantially the same as said background areas;

developer structure for developing said second CAD images formed in said second pass with an ink different from said color inks used in said first pass of the charge retentive structure;

developer structure for developing said second DAD image formed in said second pass with another color ink different from all other color inks previously used;

second means for conditioning said second virtual image formed during said second pass to form a developable DAD image;

developer structure for developing said developable DAD image formed from the second virtual image formed during said second pass with an ink that is the same color as one of the inks used in said first pass; and means for conditioning said developed images for effecting transfer thereof to a final substrate.

12. Apparatus according to claim 11 wherein said means for creating tri-level images in both said first and second passes comprises a single exposure device operating at two different wavelengths and said charge retentive structure comprises two layers each responsive to one of said two different wavelengths.

13. Apparatus according to claim 12 including means for leveling the voltage on said charge retentive structure prior to the operation of said first and second means for conditioning.

14. Apparatus according to claim 13 wherein said first and second means for conditioning comprises a dual wavelength band flood exposure lamp and selectable dual bandpass filter; and wherein the bandpass filter is selectable to operate at one wavelength to effect a first flood exposure as said first means for conditioning and to operate at the other of said dual wavelengths to effect flood exposure as said second means for conditioning.

15. Apparatus according to claim 14 wherein all of said inks comprise toner particles.

16. Apparatus according to claim 15 wherein the colors of toner particles developed during a first pass comprise two of the three subtractive primary colors.

17. Apparatus according to claim 16 wherein the toner particles used during a second pass comprises two of the three subtractive primary colors, one of which is the same as one of the primary colors of toner particles used during the first pass and the other primary color is the one not used during the first pass.

18. Apparatus according to claim 17 wherein said color of toner particles used in said second pass that is the same as one of the color of toner particles used in the first pass is magenta.

19. Apparatus according to claim 11 wherein said ink for developing said first CAD images formed during said first pass contains carbon black.

20. Apparatus according to claim 11 wherein said ink for developing said first CAD images formed during said first pass contains black organic pigment.

* * * * *